Figure 1:
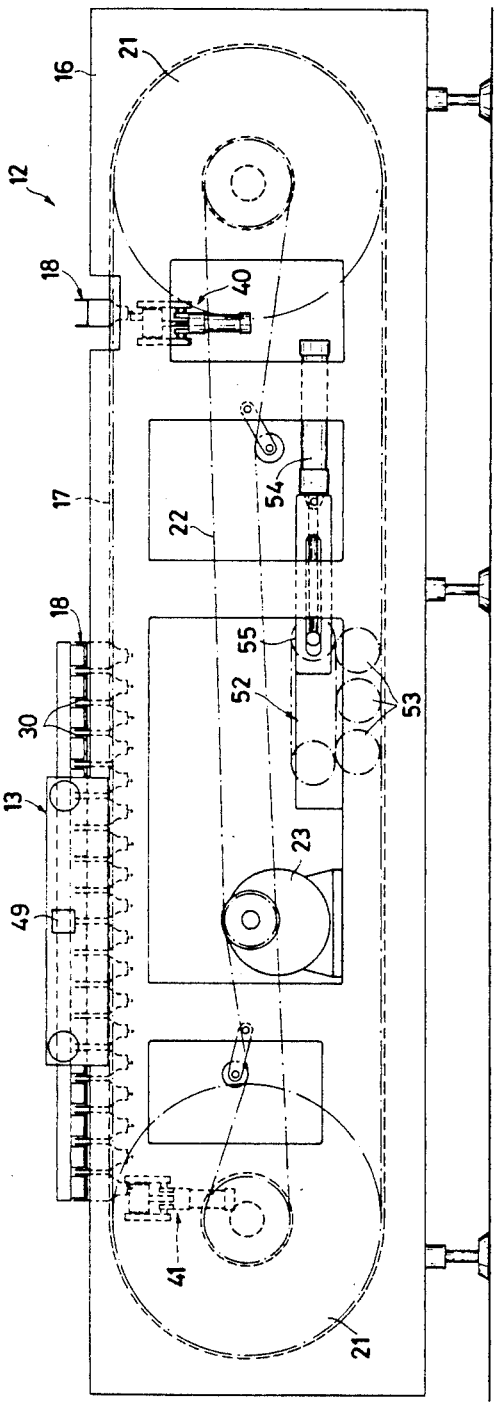

United States Patent [19]

Colamussi

[11] Patent Number: 5,046,598

[45] Date of Patent: Sep. 10, 1991

[54] APPARATUS FOR CONVEYING, ACCUMULATING IN SUCCESSION AND ARRANGING PRODUCTS OR READY-MADE ARTICLES IN GROUPS

[75] Inventor: Arturo Colamussi, Ferrara, Italy

[73] Assignee: Vortex Systems S.r.l., Fossalta di Copparo, Italy

[21] Appl. No.: 268,737

[22] Filed: Nov. 8, 1988

[30] Foreign Application Priority Data

Nov. 13, 1987 [IT] Italy ............................ 22645 A/87
May 25, 1988 [IT] Italy ............................ 20730 A/88

[51] Int. Cl.$^5$ ............................................ B65G 29/00
[52] U.S. Cl. ............................ 198/465.1; 198/803.01
[58] Field of Search ................ 198/465.1, 803.01, 430

[56] References Cited

U.S. PATENT DOCUMENTS 4,751,998  6/1988  Yano ................................ 198/465.1
4,756,400  7/1988  Funo et al. ...................... 198/430 X
4,768,641  9/1988  Hibi et al. ..................... 198/465.1 X Primary Examiner—Robert P. Olszewski
Assistant Examiner—Cheryl L. Gastineau
Attorney, Agent, or Firm—Charles A. Brown

[57] ABSTRACT

An apparatus for conveying, accumulating in succession and arranging products or ready-made articles in groups, with the products or ready-made articles being fed to the same apparatus on one or more rows of conveyors, wherein the individual packages or the individual ready-made articles are orderly positioned inside independent saddles, positioned in succession, and driven along the pathway of the apparatus. The saddles are moved by a continuous, closed-loop element, to which they can be selectively and elastically linked by friction elements, and are disengaged by simple engagement with stopping elements.

11 Claims, 9 Drawing Sheets

APPARATUS FOR CONVEYING, ACCUMULATING IN SUCCESSION AND ARRANGING PRODUCTS OR READY-MADE ARTICLES IN GROUPS

The present invention relates to an apparatus for conveying, accumulating in succession and arranging products or ready-made articles in groups.

Any facilities or production lines for manufacturing products, whether alimentary products or not, is usually formed by a plurality of machines or equipment pieces which carry out in sequence the necessary operations for forming, packaging, transforming, putting in order, discharging, and possibly boxing the product.

Taking as an example a production line for an edible product, e.g., an ice-cream or a baked product, there exists always a machine for producing it, a tunnel or a chamber wherein the physical and/or chemical treatment takes place, and one or more machines for packaging the individual piece, generally inside bags, the arranging in groups of pieces, and the further packaging of a plurality of these, generally inside boxes.

From a historical point of view, the machines for wrapping the product were invented first, immediately followed by the systems for tunnel- or cell-treatment, whilst the need for a mechanized and packaging and boxing of the individual article, or of groups or products, arose at a later time.

The development in succession of the suitable machines for the various steps, with an evolutionary process always from upstream to downstream, determined the same limits of the technology. Those who created the tunnels, or the boxing machines, accepted, as a matter of fact, the packaging machine as they are, and tried to adapt the downstream machines to the requirements of the upstream ones.

At the same time, not much attention was paid to the more and more increasing requirement of having available flexible production lines or facilities, both as relates the productivity, and the typologies of treatment of the products or of the ready-made articles. In fact, the present need for having the possibility of arranging and/or subdividing again the incoming products from single-line or multi-line facilities saw the development of machines predisposed and dedicated to the individual requirement, which are poorly able to allow changes to be made in the format of both the product and of group of products; but which, above all, are not capable of accepting feeds of product from a plurality of different and variable lines.

A purpose of the present invention is to solve such problems, by providing an apparatus which is capable of receiving products, incoming both from one single production line, wherein such products are positioned after each other, and from a plurality of lines, so that they are arranged as pairs of products and independent from each other, and of arranging the same products, at the outlet side, both as individual products, according to preselected interspaces and times, and as groups containing a preselected number of articles, according to the requirement to be met downstream the same apparatus.

A further purpose is that such an apparatus should be capable of arranging the products in preselected groups, independently from the continuity, and the perfect frequency of feeding of the incoming product, compensating, e.g., for a temporary lack inside the production line, or inside one of the production lines, and independently from the type of variable devices associated in parallel to it.

These purposes are achieved according to the present invention by providing an apparatus for conveying, accumulatiing in succession and arranging products or ready-made articles in groups, which can be installed inside a facility in correspondence of the outlet end of at least one conveyor unit feeding the products or ready-made articles, formed and arriving after each other, and can be coupled with at least one device for discharging the products or ready-made articles, or taking them from container means of a collecting conveyor means, or from at least one device which requires an arrangement in groups in order to perform its positive action, with the apparatus being of the conveyor means type, wherein the products are collected inside container means side-by-side to each other, characterized in that the collection conveyor runs along a closed-loop pathway positioned inside a framework, and comprises a set of saddles bearing the container means, or another piece of equipment suitable for supporting the product, with the saddles being slidingly driven independently from one another on guide elements, also provided along the pathway, by means of the engagement of a friction-pad element, integral with each one of the saddles, with whatever portions of at least one continuous, closed-loop driving element, also positioned along the closed-loop pathway and driven to continuously move by at least one driving pulley driven by a central motor unit, with the engagement of the friction pad being secured by an elastic thrust element, positioned to interact between a portion of each one of said saddles and the pad element, with the saddles furthermore bearing an appendix element entering in engagement, along the pathway, with at least one stopping element for the saddles, which is selectively actuated by at least one sensor element provided in correspondence of the at least one product feeding conveyor means, with the elastic thrust element being such as to enable the friction pad element of the saddles to slide above the at least one continuous closed-loop driving element when the appendix element borne by the saddle gets into engagement with the stopping elements.

Figure 2:
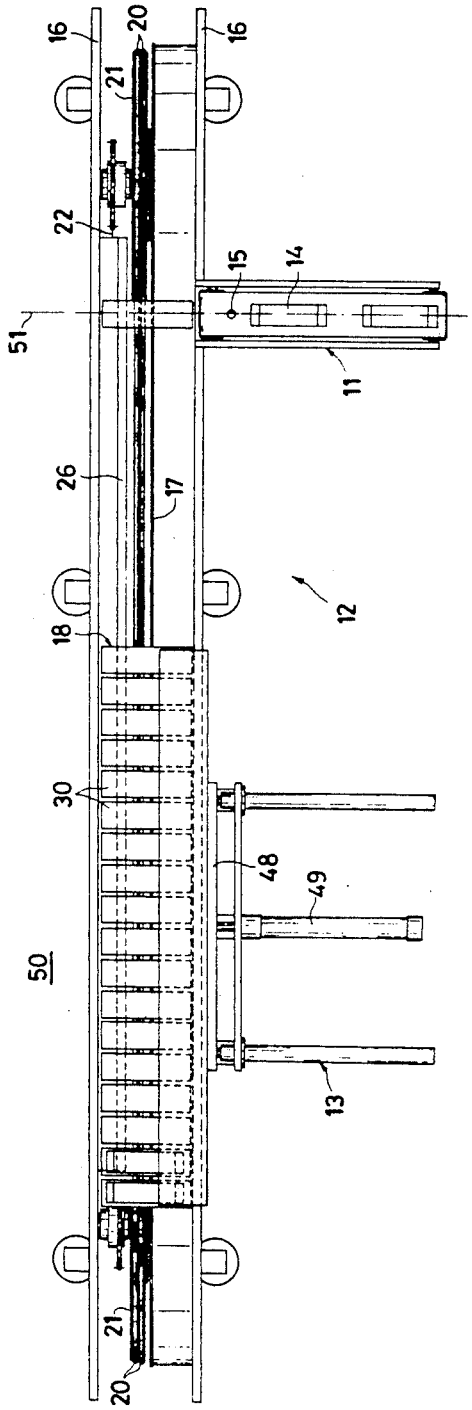
Figure 3:
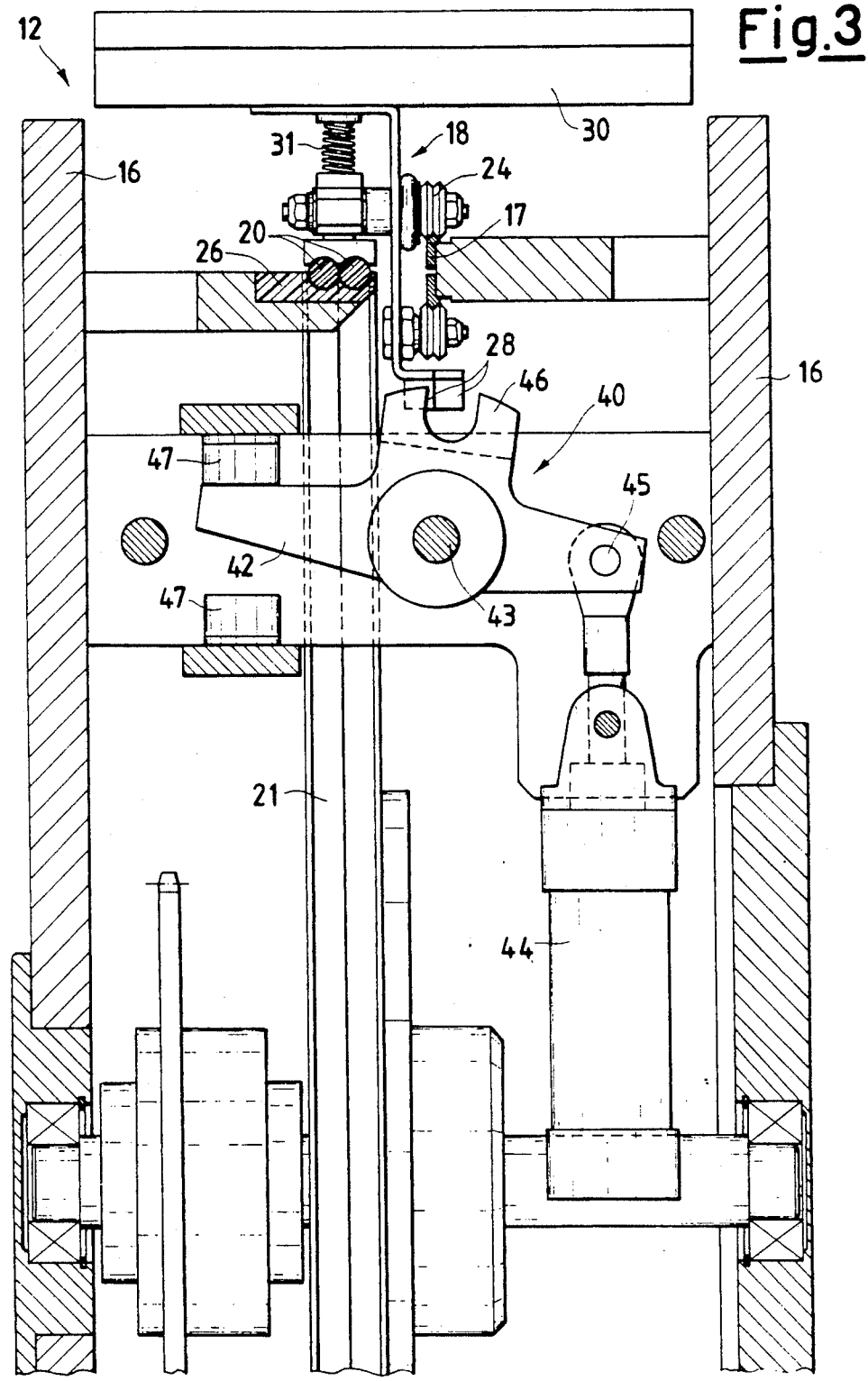
Figure 4:
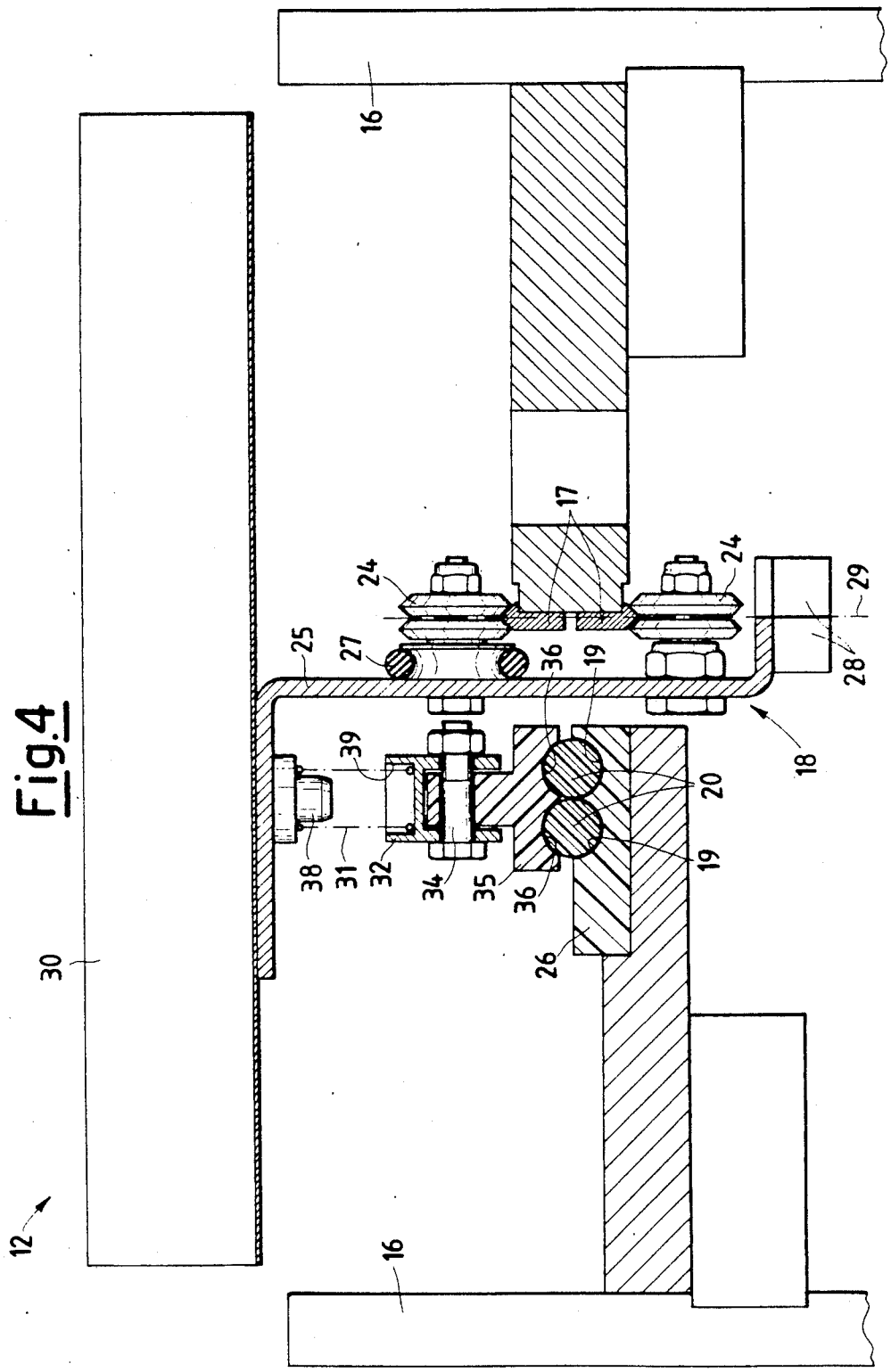
Figure 5:
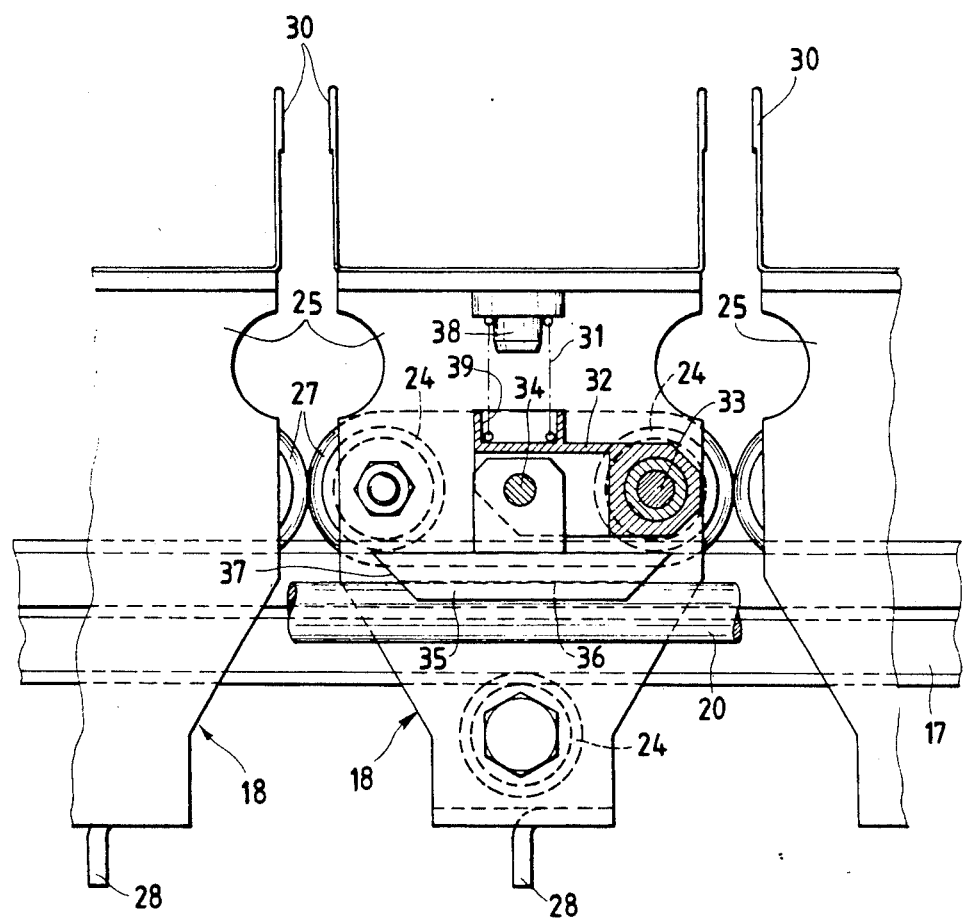
Figure 6:
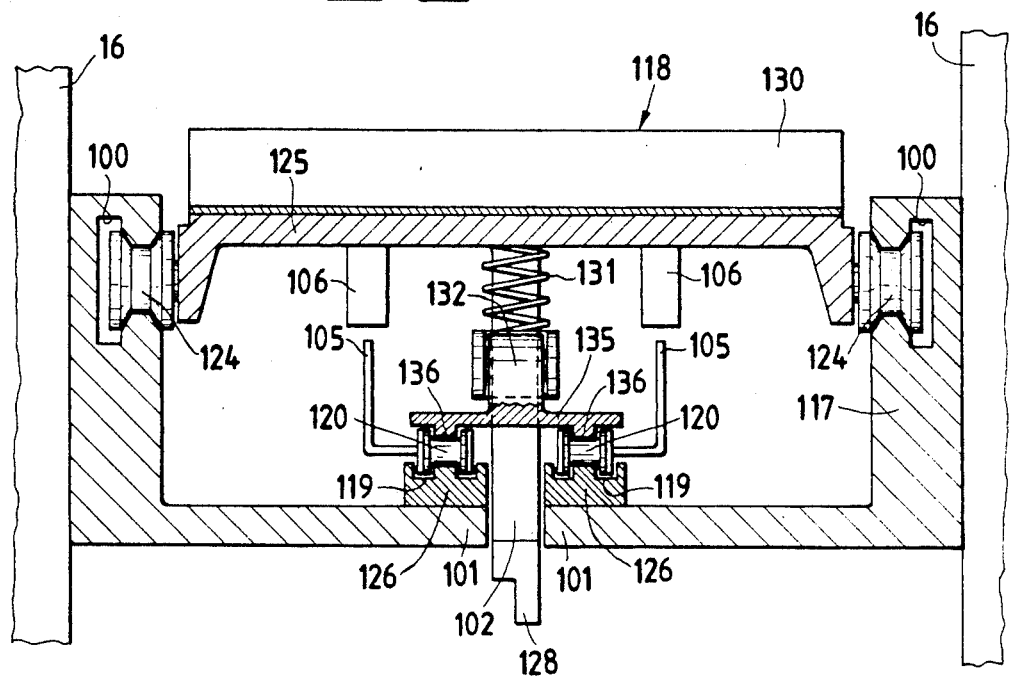
Figure 7:
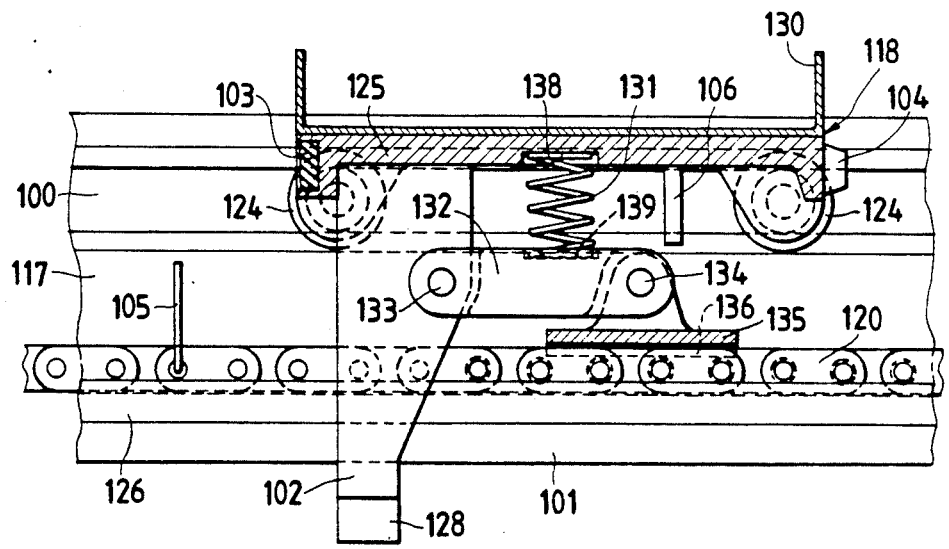
Figure 8:
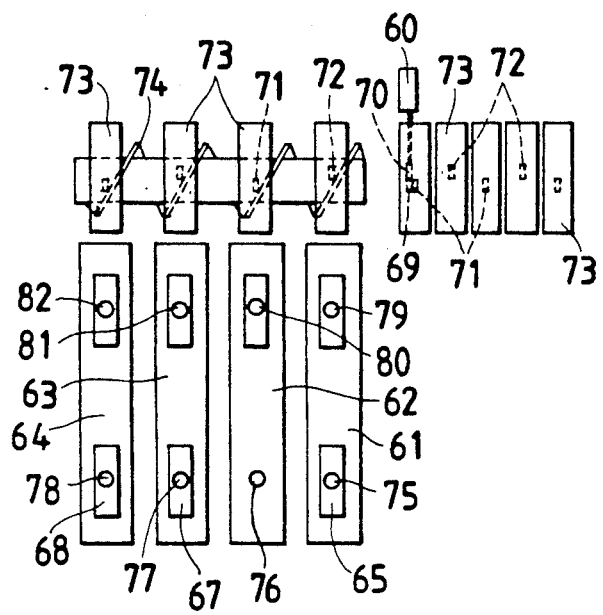
Figure 9:
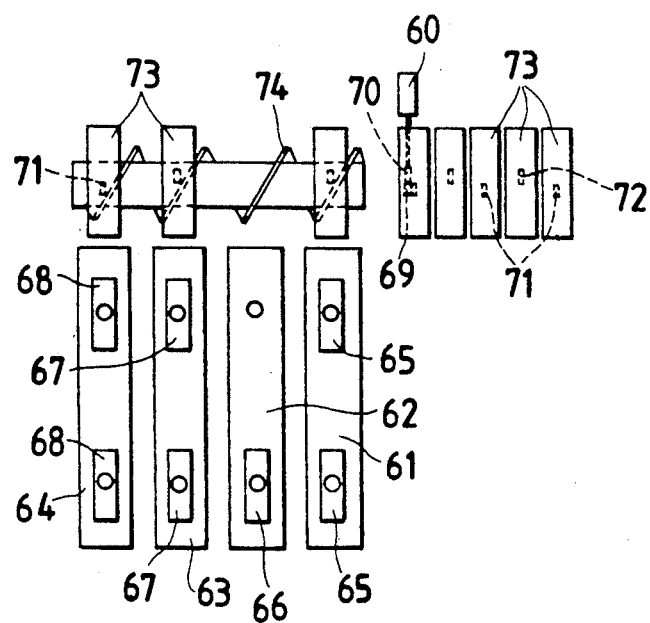
Figure 10:
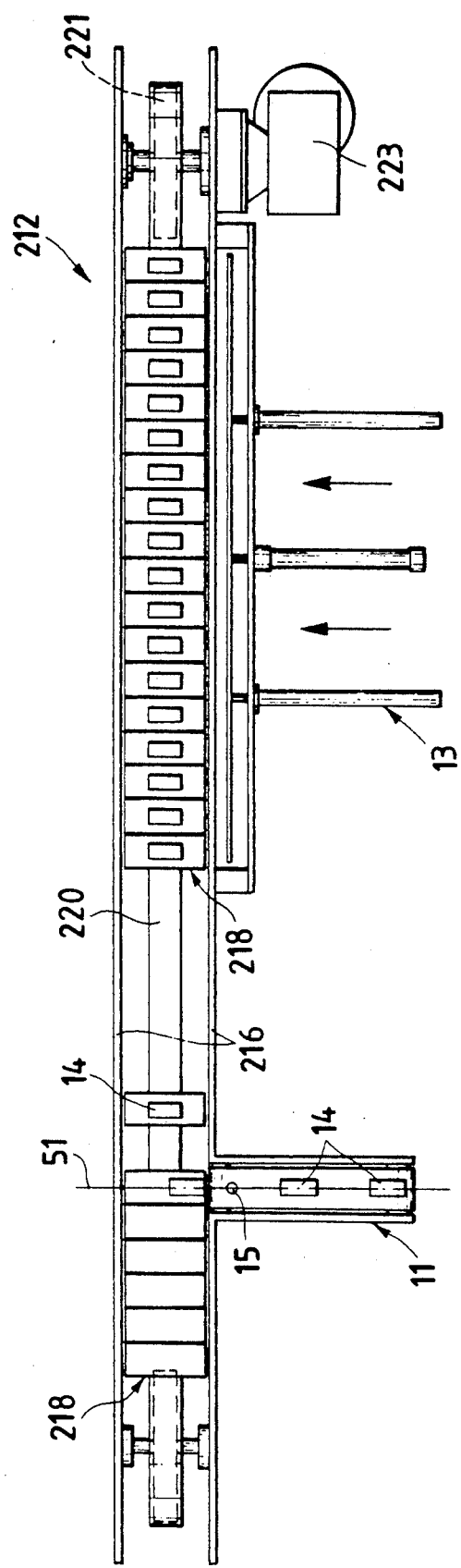
Figure 11:
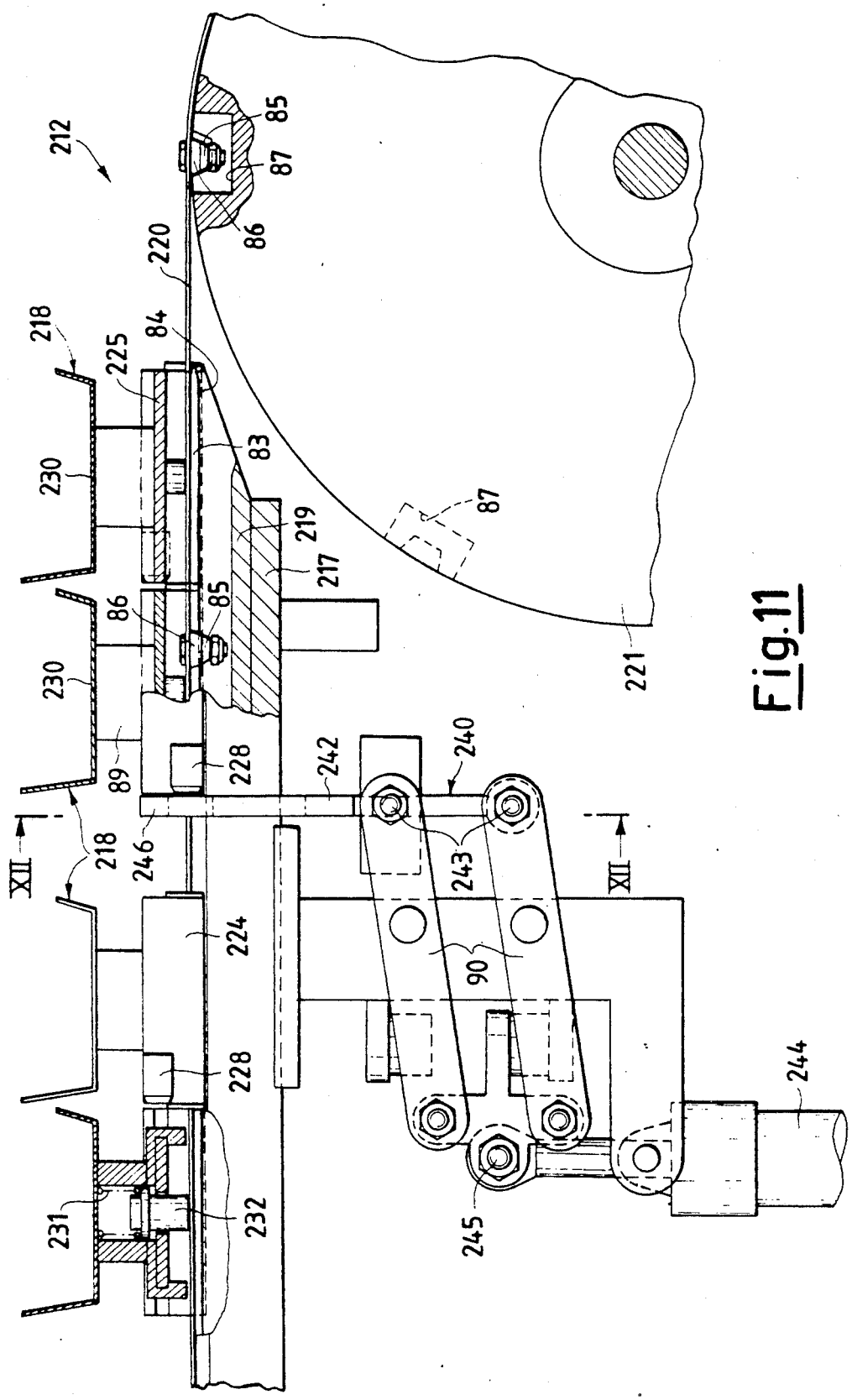
Figure 12:
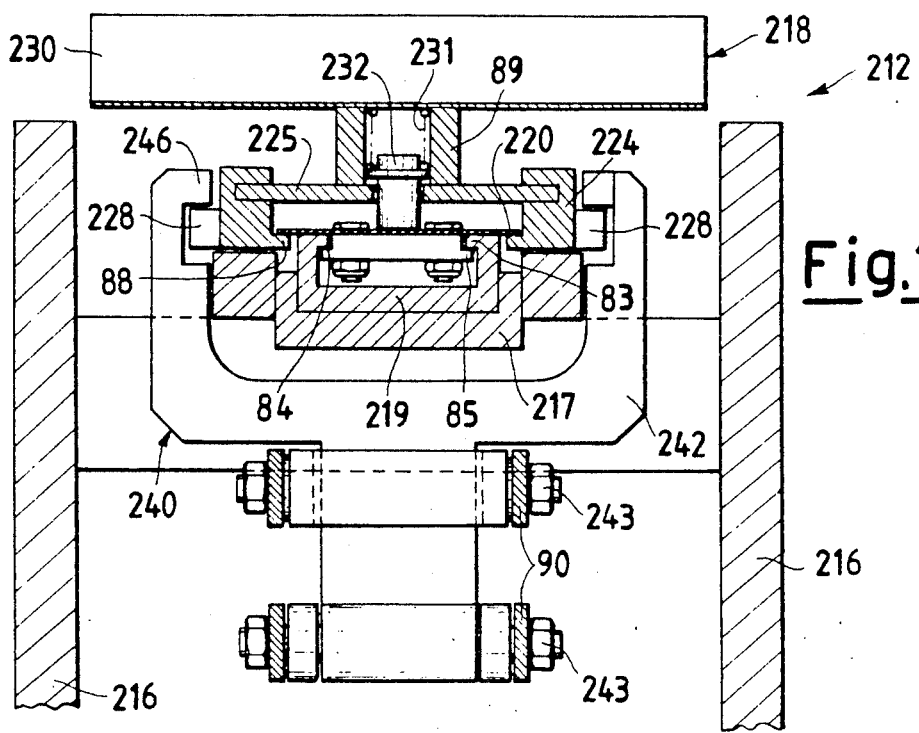
Figure 13:
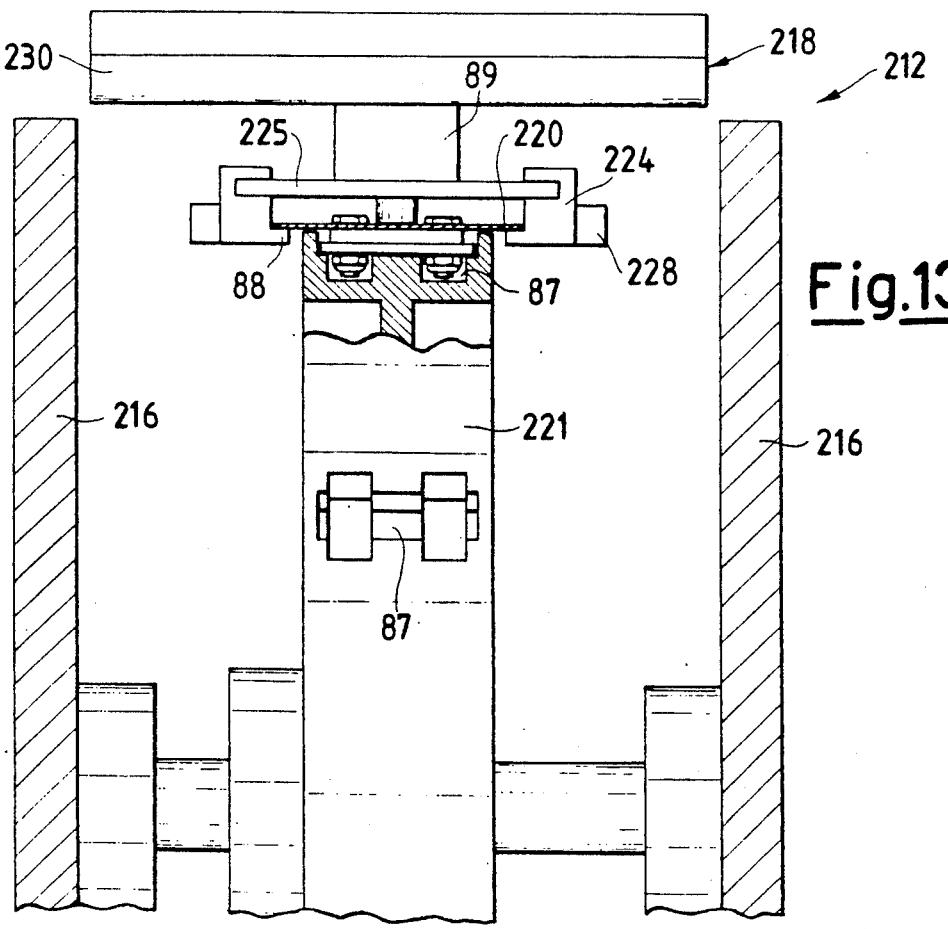

The structural and functional characteristics and the advantages of an improved apparatus according to the present invention will be better understood from the following exemplifying, non-limitative disclosure referring to the hereto attached schematic drawings, in which:

FIG. 1 shows an elevation view of a conveyor means for collecting products, of an apparatus according to the present invention, FIG. 2 shows a plan view of the product collecting conveyor means of FIG. 1, FIG. 3 shows an enlarged elevation sectional view of a stopping element at the beginning of the pathway, in correspondence of a product feeding conveyor means, FIG. 4 shows a larger-enlarged cross-sectional view of a saddle of the product collecting conveyor means, FIG. 5 shows a partially sectional side elevation view of the saddle of the product conveyor means of FIG. 4, FIG. 6 shows an enlarged cross-sectional view of a further example of a saddle of a collectiong conveyor means, FIG. 7 shows a partially sectional side elevation view of the saddle of FIG. 6, FIG. 8 shows a schematic plan view of a facility with four feeding conveyor means, FIG. 9 shows a view equivalent to that of FIG. 8 in a different operating position, FIG. 10 shows a schematic plan view of a further form of practical embodiment of an apparatus according to the invention, FIG. 11 shows an enlarged longitudinal side elevation view of a detail, shown in partial sectional view, of the product collecting conveyor of FIG. 10 in correspondence of a side pulley, FIG. 12 shows an enlarged cross-sectional view of the rectilinear pathway stretch in correspondence of a saddle and of a stopping device according to path XII—XII of FIG. 11; and FIG. 13 shows a sectional view equivalent to that of FIG. 12, in correspondence of the side pulley of FIG. 11, along the product collection pathway.

Referring now to FIGS. 1 and 2, an apparatus for conveying, accumulating in succession and arranging products or ready-made articles in groups, according to the present invention, generally indicated by the reference numeral 12, acts as a product collecting conveyor means, and can be positioned inside a facility, which essentially comprises at least one product feeding conveyor 11, and at least one discharging device 13 for discharging products 14, or at least one device which requires an arrangement as groups for carrying out its action, once that the products of ready-made articles are arranged as individual articles, according to a preselected pattern, or are arranged as groups containing a preselected number of products or of ready-made articles.

For exemplifying purposes, and for the sake of a better understanding, let us assume that the product 14 is an alimentary product which, once formed, and treated inside a treatment tunnel, is packaged inside a tightly sealed bag on a wrapping machine (not shown in the figures); it could anyway be a whatever else product, either alimentary or not, generally exiting a forming or processing machine.

The individual products 14, once packaged, or, better, wrapped, are collected and positioned on a conveyor belt, such as the conveyor means 11, which performs, e.g., the task of suitably spacing them from each other, so that they can be detected or discriminated by a sensor element 15, such as a photocell installed at the outlet end of the conveyor tape, before they are sent to the apparatus of product collecting conveyor means type 12 according to the invention.

The product collecting conveyor means 12, which is the central core of the facility, comprises a framework 16 on which, according to a path of closed-loop configuration running above guide elements 17, a plurality of saddles, generally indicated by the reference numeral 18, are provided.

Still according to the same closed-loop path, which is of annular type with two rectilinear parallel stretches of the guide elements 17, on the opposite side relatively to the saddle 18, inside the framwork 16, continuous seats 19 are provided, inside which continuous driving elements with closed-loop configuration, such as belts 20, slide, also according to a closed-loop path, driven by pulleys 21, which are driven by a central motor means 23, with the aid of chain transmissions 22, at least one of which is a driving one.

FIGS. 4 and 5 show, with greater clearness, a first example of a continuous driving element and a first example of a saddle. In fact, onto a shoulder of the framework 16 two parallel guide elements 17 are fastened, with the guide elements 17 having inwards-directed, tapered, point-shaped ends which match complementary grooved portions of wheels 24 integrally and rotatably constrained to the body 25 of the saddle 18. To the other shoulder of the framework, recessed guides 26 made from an anti-friction material are fastened, which are provided with two continuous seats 19 of semicylindrical shape, suitable for receiving a pair of belts 20 having a circular cross section, and for enabling the belts 20 to continuously slide.

Each saddle 18 comprises a central body 25 provided, as said, with wheels 24, namely, with three wheels, two of which are positioned on the side, and the third of which is positioned on the other the, relatively to said guide elements 17, and with a contact element 27 of ring-shaped belt type, with the belt being wound approximately in correspondence of the two upper wheels 24, and also acting as a shock-absorber means in order to prevent saddles from bumping into each other during the accumulation step.

The body 25 has a cross section of "Z"-shape; the lower end of the "Z" bears a tooth-shaped appendix element 28 facing downwards, which on successive saddles 18 is provided on opposite sides relatively to a plane transversely passing through the body of the wheels 24, and schematically represented by the axis 29.

The upper end of the body 25 supports a container means 30, such as an "U" structural steel with a large and flat base, and with open ends, and which is positioned facing outwards and transversely relatively to the closed-loop path, so as to be able to get aligned to the product feeding conveyor means 11. Under the upper end, an elastic thrust element 31, such as a helical spring, is provided, which urges downwards a floating arm 32, swinging and articulated at one of its ends, through a pivot 33, relatively to the same body 25. On its lower face, the floating arm 32 bears, integrally linked by means of a pivot 34, a friction pad element 35 which, on its side facing the belts 20 and the grooved guides 26, is also provided with two seats of semicylindrical shape 36, and has inclined-cut longitudinal ends 37, so as to have a smaller surface directed towards the belt, and enable it to adhere to the belts 20 also in correspondence of the portions of its pathway, in which it runs on the pulleys 21.

Also the friction pad element 35 is made from an anti-friction, self-lubricating, high-strength material. The elastic element 31 is maintained centered between the upper end of the body 25 and said arm 32, respectively by a stud 3 protruding from the lower face of the upper end of the body 25, and a dead hole 39 suitable for receiving it.

The particular arrangement of the three wheels 24 according to the vertices of a triangle determines a high stability of the saddle 18 even along the bent path portions in correspondence of the pulleys 21.

FIGS. 1 and 3 show two engaging and stopping elements 40 and 41 for the saddles 18, in which, more precisely, the stopping element 40 is the one which is positioned in correspondence of the product feeding conveyor means 11, whilst the stopping element 41 is positioned in correspondence of the discharging device 13.

The first stopping element 40 (FIG. 3) comprises a rocker arm 42 hinged on a central fulcrum 43 and made swing by a cylinder 44 articulatedly linked in 45 to a free end thereof. Above the central fulcrum 43, the rocker arm 42 extends into a fork shape 46 which, when swinging, alternatively comes into contact and stops the tooth-shaped appendix element 28 of successive saddles 18, provided on opposite sides relatively to the axis 29. The other free end of the rocker arm 42 is positioned between stop, shock-absorber elements 47 which limit its swinging motion. A so-made stopping element 40 makes it possible each motion to be a positive motion, also thanks to the special arrangement of the appendix elements 28.

The other stopping element 41 is very similar to the first stopping element 40, but is provided with a rocker arm (not shown in the figures), which is capable of only stopping saddles 18 which are equipped with appendix elements 28 all positioned on the same side, that is to say, e.g., either all even-numbered saddles, or all odd-numbered saddles.

Finally, the discharging device 13 is provided, which is schematically shown as pushers 48 actuated by a cylinder 49, positioned upstream the second stopping element 41, in correspondence of which the saddles 18 stop, which are full of product 14 to be discharged as a group formed by a preselected number of the products above an area indicated by the reference number 50 and which can be, e.g., a boxing station.

A so-disclosed facility, equipped with an apparatus according to the present invention, operates as follows.

The products 14, e.g., of alimentary type, such as ready-made snacks or ice-creams packaged inside tightly sealed envelopes, come to the product feeding conveyor means 11, which suitably spaces them from each other, and sends them towards the product collecting conveyor means 12, wherein each of them is positioned inside the container means 30 of a different saddle 18.

This occurs, because close to the outlet end of the product feeding conveyor means 11 a photocell 15 is provided, which, by detecting the incoming product 14 enables the loaded saddle to advance, and a successive saddle to reach its loading position, lined up to an axis 51 transversal relatively to the product collecting conveyor means 12, and coincident with the axis of the product feeding conveyor means 11.

In fact the photocell 15, intercepted by the incoming product, commands the actuation of the cylinder 44 and the consequent swinging movement of the rocker arm 42, which moves downwards from its position of FIG. 3, and enables the appendix element 28 to run inside the fork portion 46.

This liberates the saddle 18 loaded with the product 14, and enables it to advance along the upper rectilinear portion of its pathway. The movement of the thus-released saddle 18 is transmitted by the pair of belts 20 which, by sliding, by being continuously driven above the recessed guides 26, through the pad element 35 maintained under constant contact on them through the elastic element 31, drive the same saddle. Obviously, the elastic thrust element should be such as to enable the pad element to slide above the belts when the appendix element gets engaged with the stopping elements, and such as to secure the mutual engagement of the pad element and of the belt portions to take place, when the appendix element is free. In this way, the saddles are under constant movement at the same speed as of the belts until a stopping element intervenes to stop the movement. One can furthermore understand that when the saddle is released, this latter receives immediately the impulse to start moving, because the force responsible for the necessary acceleration for the saddle starting up is constantly applied.

The released saddle 18 comes therefore to a point, in which it is in correspondence with the second stopping element 41, stopping in the region wherein the product 14 discharging device 13 is provided. In the mean time, still very rapidly, the successive saddle 18 had reached its proper position in order to receive inside its container means 30 the product 14 which had intercepted the photocell 15. In this way, each time that a product arrives, the relevant saddles are released and positioned.

One can understand that in this way the saddles, which were stored, or kept in a buffer magazine under standby condition upstream the first stopping element 40, are filled, and simultaneously saddles full of product are accumulated in an area upstream the second stopping element 41.

This second accumulation continues until the saddles reach the number corresponding to the preselected group. Only at that time, the discharge device 13 is actuated, which, through the pushers 48, discharges the desired product group and, after returning back to its initial position, makes it possible the saddles 18, by now empty, to be released. This takes place by actuating the second stopping element 41, so as to release the first saddle, and consequently, all successive saddles. For example, the lever 42 will have its portion 46 without one of the branches of the fork so that, once shifted, it releases both the saddles with their appendix on one side, as well as the saddles with their appendix on the other side, relatively to the axis 29.

For a better function, although on the various saddles 18 the contact and shock-absorbing elements 27 are provided, further stopping elements may be provided along the pathway, which make it furthermore possible a plurality of groups, or groups spaced apart from each other, to be accomplished at the outlet side.

Furthermore, e.g., in the bottom portion of the framework 16, a belt 20 tightener device 52 can be installed with winding rolls 53 for the belts 20, which comprise a cylinder 54 for shifting at least one roll 55, by means of which the perfect tightening of the same belts is accomplished.

In a facility equipped with an apparatus according to the present invention, the operations of loading and unloading of the saddles 18 are hence completely made mutually independent, and the disclosed system makes it advantageously possible downstream-occurring breaks to be absorbed, as well as operating cycles to be accepted, which provide for particularly long periodical steps, which can be associated again in the successive steps.

FIGS. 6 and 7 show a further form of practical embodiment, supplied for exemplifying purposes, wherein a product collecting conveyor means is depicted, which comprises a framework 16 on which, according to a closed-loop pathway, a plurality of saddles 118 sliding above guide elements 117 are provided. The guide elements 117, which have an "L"-shaped cross-section, fastened to shoulders of the apparatus 16, and opposite to each other, have longitudinal seats 100 suitable for receiving wheels 124 integrally and rotatably constrained to a body 125 of the saddle 118.

On mutually opposite ends 101 of the guide elements 117, guides 126 made from an antifriction material are positioned, which are provided with continuous seats 119 suitable for receiving the continuous, closed-loop driving element which, in this case, is a chain 120, and enabling the driving element to slide as well. Also in this case the continuous driving elements are two, i.e., two chains 120, which are driven by sprocket gears driven by a central motor means, similar to that of FIGS. 1 and 2, and not shown.

Each saddle 118 comprises a central body 125 provided with wheels 124, in a number of four, arranged as pairs of wheels on opposite sides, so to enter the longitudinal seats 100. The body 125 has an upper flat outline, on which a container means 130, or another implement for supporting the product, can be positioned, and is provided at its centre with a portion 102 which extends downwards, and bears at a free end thereof, an appendix element 128, also directed downwards, and positioned on successive saddles 118 in the same way as for the saddles 18.

The portion 102 of the body 125 enters between the two chains 120, and in an intermediate portion thereof bears a floating arm 132, swinging and linked in correspondence of an end 133 thereof. At its other end of the arm 132, a pivot 134 articulatedly bears a pad element 135 which, in its portion facing the chain 120 and the grooved guides 126, has such an outline 136 as to get engaged on the same chains. The body 125 has, under its surface, in correspondence of the arm 132, a seat 138 suitable for receiving the end of an elastic thrust element 131 which, by engaging inside a further seat 139 provided on the arm 132, keeps the same arm, and consequently the friction pad element 135, engaged on the chains 120. Also the saddle 118 can be provided with contact seats 103 and complementary resting seats 104 on two longitudinal sides of the body 125, respectively acting as an impact absorber element and a contact element for the impact absorber element, so as to deaden the force of the bumps between the saddles during the accumulation step.

It is thus evident that a saddle 118 having this latter configuration, driven by chains 120, is endowed as well with the characteristics typical for the apparatus according to the invention.

The figures from 10 to 13 show, for exemplifying purposes, a further form of practical embodiment according to the invention.

In fact, FIG. 10, essentially similar to FIG. 2, wherein, for same details, the same reference numerals are used, shows for exemplifying purposes a further product collecting conveyor means, generally indicated by the reference numeral 212, as the central core of the facility.

The product collecting conveyor 212 comprises a framework 216 on which, according to a closed-loop pathway above a fixed guide element generally indicated by the reference numeral 217, a plurality of saddles, generally indicated by the reference numeral 218, are provided.

The closed-loop pathway is of the ring type with two rectilinear portions and the guide element 217 has a cross-section having a flattened and enlarged "U" shape, and is provided with a top portion constituting a continuous seat 219 of an anti-friction material. Above said latter continuous seat 219, a closed-loop continuous element 220 slides, such as a flexible belt, which acts both as a driving element, and as a guide element. The continuous element 220 is driven by pulleys 221, driven by means of a centralized drive unit schematically shown in 223, wherein at least one of said pulleys is a driving pulley.

FIGS. 11, 12 and 13 show, with greated clearness, an exempifying form of practical embodiment of continuous, closed-loop element 220, and an exemplifying form of practical embodiment of saddle 218. In fact, to a cross-piece interposed between shoulders of the framework 216, as said, a guide element 217 is fastened, which supports the continuous seat portion 219, also having a cross-section of flattened and enlarged "U"-shape, contained inside said guide element 217, and having inwards-directed, bent and horizontal upper edges 83, so as to define undercuts 84 which engage with appendices 85 extending from a plurality of blocks 86 fastened under the continuous, closed-loop element.

The blocks 86 are spaced apart form each other along the lower portion of the continuous element 220, so as to be able to perfectly enter and engage hollows 87 complementary to them, and provided in both pulleys 221.

Each saddle 218 comprises a central, flat body 225, provided with a number of four side appendices or teeth 224 constituting sliding clocks, wherein two of said sliding blocks 224 are positioned on the one side, and the remainder two of them are positioned on the other side, relatively to said guide element 217. The slider block teeth 224 are bent with free ends 88 directed inwards in the horizontal direction, so as to define shaped appendices, in such a way as to come to lay under side longitudinal edges of the continuous, closed-loop element 220.

The body 225 has, in this way, a reverse-"U"-shaped outline, and is laterally provided with appendix elements 228, also of tooth shape, which are directed outwards, and are positioned, on successive saddles 218, at heights different from each other.

The upper end of the body 225 integrally supports a container means 230, such as an "U"-shaped structural steel with a wide and flat base and open ends, and which is positioned directed outwards and transversely to the closed-loop path, so as to be able to line up with the product feeding conveyor means 11. Under said upper end, a friction pad element is interposed, which comprises an elastic thrust element 231, such as a helical spring, which keeps urged downwards a stud 232 floating in a direction perpendicular to the continuous element 220. The stud 232 can be shifted inside a sleeve of containment and junction 89, which constraints, and make mutually integral the container means 230 and the body 225.

The stud 232 in its portion facing the continuous element 220 is made from an anti-friction material, in the same way as at least the inwards-bent ends 88 of the body 225 are made from a self-lubricating anti-friction material.

In FIGS. 11 and 12, also a locking and stopping element 240 for said saddles 218 is shown. The stopping element 240 comprises an enlarged-"U"-shaped element 242, inside the side flanges of which tooth portions 246 are provided, which are suitable for coming to rest against, and restraining the appendix elements 228 provided on the saddles 218. The enlarged-"U"-shaped element 242 is vertically shiftable in order to interact with the appendix elements 228 through an articulated-parallelogram lever system 90 hinged in 243 to the same enlarged-"U"-shaped element 242, and in 245 to an end of an actuator cylinder 244.

It results hence clear that the movement in the vertical direction of the enlarged-"U"-shaped element 242 causes the tooth portions 246 to interact with the appendix elements 228 of the saddles 218 which have to be stopped.

A further apparatus to disclosed and accomplished according to the instant invention operates as follows.

The products 14 come to the product feeding conveyor means 11, which suitably spaces them from each other, and sends them towards the product collecting conveyor means 212, wherein each of them are positioned inside the container means 230 of a different saddle 218.

This occurs, because close to the outlet end of the product feeding conveyor means 11 a photocell 15 is provided, which, by detecting the incoming product 14 enables the loaded saddle 218 to advance, and a successive saddle to reach its loading position, lined up to an axis 51 transversal relatively to the product collecting conveyor means 212, and coincident with the axis of the product feeding conveyor means 11.

In fact, the photocell 15, intercepted by the incoming product, commands the actuation of the cylinder 244 and the consequent swinging movement of the enlarged-"U"-shaped element 242, which moves downwords and enables the appendix element 228 to freely run inside the tooth portion 246.

This liberates the saddle 218 loaded with the product 14, and enables it to advance along the upper rectilinear portion of the pathway. The movement of the thus liberated saddle 218 is transmitted by the continuous element 220 engaged between the stud 232, urged by the helical spring 231, and the bent end appendices 88 of the body 225. It should be observed that the closed-loop continuous element 220 results to be perfectly guided by the cooperation of the appendices 85 of the blocks 86 in engagement with undercuts 84 of the continuous seat 219, and respectively of the upper surface of the continuous seat 219 under the same continuous element.

It is thus interesting to observe that in the improved apparatus according to the present invention, the continuous element acts simultaneously as the driving element, and the guide element. In fact, such a continuous element acts as the driving elements by engaging a friction-pad element, integral with each one of said saddles, with a whatever portion of the same element, which in its turn is driven to move by the engagement of the blocks inside the seats provided in the driven pulleys. Furthermore, it also acts as the guide element, in that it cooperates with the continuous seat 219 and with the undercuts provided in the same continuous seat.

The engagement of the saddles with the continuous element is accomplished, as said, by the friction force arising between the stud 232 and the upper surface of the same continuous element, and such a force can be varied, or predetermined for the desired use, by suitably replacing the thrust spring.

The continuous, closed-loop element can of course be, according to the intended use, a flexible belt of steel, of a light alloy or of a plastic material, as well as the anti-friction portions can be made from a material suitable for no-wear sliding on metal, or non-metal, surfaces.

FIGS. 8 and 9 show then how an apparatus according to the present invention may result particularly advantageous in case a plurality of product feeding conveyor means are present; in the example shown such product feeding conveyor means are four, and are indicated by the reference numerals 61, 62, 63 and 64; from them, products 65, 66, 67 and 68 respectively arrive.

On a stopping element 60, there are shown only two stopping teeth 69 and 70 for appendix elements 71 and 72 of successive saddles 73, with said appendix elements being staggered relatively to each other on successive saddles. Downstream the stopping element, an Archimedean screw 74 is provided, which acts as the metering element for the feed of the saddles 73 towards the various conveyor means 61, 62, 63 and 64, with these latter being equipped with first sensor elements 75, 76, 77, 78, connected to the stopping element 60, and with second sensor elements 79, 80, 81, 82, connected to the Archimedean screw 74.

FIG. 8 shows a first operating position in which, after that, in a previous step, the first sensor elements 75-78 have all detected the presence of products 65-68, the stopping element 60 allowed the Archimedean screw 74 to feed four saddles 73, which are now to receive the same products running under the second sensor elements 79-82.

But, now, the sensor element 76 of the product feeding conveyor means 62 does not detect the passage of any products 66. As a consequence thereof, the stopping element 60 makes it possible, by actuating in sequence the locking teeth 69 and 70, two saddles 73 to be introduced into the first two successive pitches of the screw 74. After this, the stopping element 60 remains stationary during one revolution of the screw 74, and only in correspondence of a fourth pitch, it shifts the stopping tooth 69, thus allowing a third saddle 73 to enter the screw.

In the mean time, the previously loaded saddles have been moved away, and the three products detected by the first sensor elements 75, 77 and 78 have come in correspondence of the three saddles 73 under the second sensor elements 79, 81 and 82.

In this way, the products 65, 67, 68, come to be placed on three saddles 73 which, after exiting the screw 74, become successive saddles with no interposition of empty saddles, so as to secure that always complete groups are formed. One can thus see how, in case of a product lack, as well as in case of single feed, or in case of multi-feed, the guarantee is obtained that always complete groups are accomplished, which contain the preselected number of articles, with said number being variable as desired.

As such a metering element for the controlled feed of the saddles 73, a closed-loop chain conveyor means provided with pushers can be of course provided, wherein the pushers are positioned at such distances that the saddles are brought in correspondence of the various product feeding conveyor means 61-64, anyway providing an apparatus falling within the scope of the present invention.

Furthermore, integral with said continuous drive elements, such as the belts 20 and the chains 120, pusher elements can be provided, such as they are identified in FIGS. 6 and 7 by the reference numeral 105, which, by coming into engagement with enlarged portions 106, provided under the body 125 of the saddle, determine a positive engagement between the same saddle 118 and the chains 120. Such an engagement secures the driving of the saddle by the belts or chains even in case the saddle, for example, owing to the load, tends to slip, or the force applied by the spring is not high enough to secure a continuous motion.

An apparatus according to the present invention can be therefore assimilated to a de-synchronizer, because it is capable of untying and make mutually independent individual operations inside a facility.

In fact, a conveyance is accomplished, wherein each conveyed product (article) is associated to an independent saddle (carrier), which is capable of following a motion law which is definable, preselectable and presettable by the user. In such a way, a facility equipped with an apparatus according to the present invention makes it possible a product position to be attained, which is independent from the position of the saddle.

I claim:

1. An apparatus for conveying, accumulating in succession and arranging articles in groups, said conveying apparatus receiving articles from at least one feed conveyor and discharging the received articles upon a discharging conveyor, said conveying apparatus comprising an article collecting conveyor having at least one continuous closed-loop driving element being driven by a drive pulley which is driven by a central motor unit, said at least one continuous closed-loop element being moved along a closed-loop pathway positioned inside a framework of said article collecting conveyor, container means being arranged in side-by-side relation to each other for receiving the received articles, said container means being moved from the at least one feed conveyor along said article collecting conveyor to the discharging conveyor by said at least one continuous closed-loop driving element, a plurality of saddles with each saddle providing support for at least one of said container means carrying an article of the received articles, each saddle being slidingly moved independently from one another by said at least one continuous closed-loop driving element and on guide elements, friction means for frictionally retaining each saddle to said at least one continuous closed-loop driving element, each saddle having an appendix element, at least one stopping element being positioned along the pathway for contacting said appendix element of each saddle whereby said friction means of each saddle is frictionally released from said at least one continuous closed-loop driving element to slide, first sensor means for detecting articles on the article feeding conveyor and activating said at least one stopping element being provided, said at least one continuous closed-loop driving element being slidably guided on recessed guides made from an anti-friction material along the closed-loop path, both said recessed guides and said friction means of said saddles having on mutually opposite faces seats of complementary shape relatively to said at least one continuous closed-loop driving element.

2. Apparatus according to claim 1, wherein said friction means is positioned on an arm floating relatively to said saddle, with said friction means interacting between said floating arm and a portion of said saddles.

3. Apparatus according to claim 1, wherein a further stopping element is provided, which is positioned downstream of the discharge conveyor, suitable for determining the accumulation of said plurality of saddles in a number at least equal to the number of articles contained in a preselected article group.

4. An apparatus for conveying, accumulating in succession and arranging articles in groups, said conveying apparatus receiving articles from at least one feed conveyor and discharging the received articles upon a discharging conveyor, said conveying apparatus comprising an article collecting conveyor having at least one continuous closed-loop driving element being driven by a drive pulley which is driven by a central motor unit, said at least one continuous closed-loop element being moved along a closed-loop pathway positioned inside a framework of said article collecting conveyor, container means being arranged in side-by-side relation to each other for receiving the received articles, said container means being moved from the at least one feed conveyor along said article collecting conveyor to the discharging conveyor by said at least one continuous closed-loop driving element, a plurality of saddles with each saddle providing support for at least one of said container means carrying an article of the received articles, each saddle being slidingly moved independently from one another by said at least one continuous closed-loop driving element and on guide elements, friction means for frictionally retaining each saddle to said at least one continuous closed-loop driving element, each saddle having an appendix element, at least one stopping element being positioned along the pathway for contacting said appendix element of each saddle whereby said friction means of each saddle is frictionally released from said at least one continuous closed-loop driving element to slide, first sensor means for detecting articles on the article feeding conveyor and activating said at least one stopping element being provided said at least one stopping element comprises a rocker arm centrally hinged and linked, at a free end, to a cylinder, with said rocker arm extending into an upper fork-shaped portion, suitable for coming to rest against said appendix elements of said saddles.

5. Apparatus according to claim 4, wherein said plurality of saddles positioned in succession after each other are provided with appendix elements so positioned as to come to alternatively rest against opposite ends of said fork-shaped portion of said stopping element.

6. An apparatus for conveying, accumulating in succession and arranging articles in groups, said conveying apparatus receiving articles from at least one feed conveyor and discharging the received articles upon a discharging conveyor, said conveying apparatus comprising an article collecting conveyor having at least one continuous closed-loop driving element being driven by a drive pulley which is driven by a central motor unit, said at least one continuous closed-loop element being moved along a closed-loop pathway positioned inside a framework of said article collecting conveyor, container means being arranged in side-by-side relation to each other for receiving the received articles, said container means being moved from the at least one feed conveyor along said article collecting conveyor to the discharging conveyor by said at least one continuous closed-loop driving element, a plurality of saddles with each saddle providing support for at least one of said container means carrying an article of the received articles, each saddle being slidingly moved independently from one another by said at least one continuous closed-loop driving element and on guide elements, friction means for frictionally retaining each saddle to said at least one continuous closed-loop driving element, each saddle having an appendix element, at least one stopping element being positioned along the pathway for contacting said appendix element of each saddle whereby said friction means of each saddle is frictionally released from said at least one continuous closed-loop driving element to slide, first sensor means for detecting articles on the article feeding conveyor and activating said at least one stopping element being provided said at least one continuous closed-loop driving element furthermore acting as said guide element for said saddles, cooperating with undercuts of said guide elements integral with said framework.

7. Apparatus according to claim 6, wherein said continuous closedloop element is a flexible belt.

8. Apparatus according to claim 7, wherein each one of said saddles comprises a flat central body, provided with at least two bent, flat, side appendices with free ends, so as to come to lay under longitudinal side edges of said flexible belt, with said friction means being centrally positioned in a body of said saddle which has a sleeve shape, and contains a stud floating in a direction perpendicular to said flexible belt.

9. Apparatus according to claim 6, wherein under said continuous closed-loop element a plurality of blocks are fastened, which are spaced from each other, and are suitable to enter complementary hollows provided on at least one drive pulley.

10. Apparatus according to claim 6 wherein said at least one stopping element comprises an enlarged-"U"-shaped element provided, on its side flanges, with at least one tooth-shaped portion suitable for coming to rest against, and to block, said at least one appendix element integral with each one of said saddles.

11. Apparatus according to claim 10 wherein said at least one stopping element can be shifted by means of a parallelogram lever system actuated by an actuator cylinder in such a way as to interact with at least one appendix element of said saddles, wherein the appendix elements are positioned on successive saddles at mutually different heights.

* * * * *